Jan. 15, 1946.     O. E. FISHBURN     2,393,153
CLUTCH CONTROL MEANS
Filed May 13, 1944
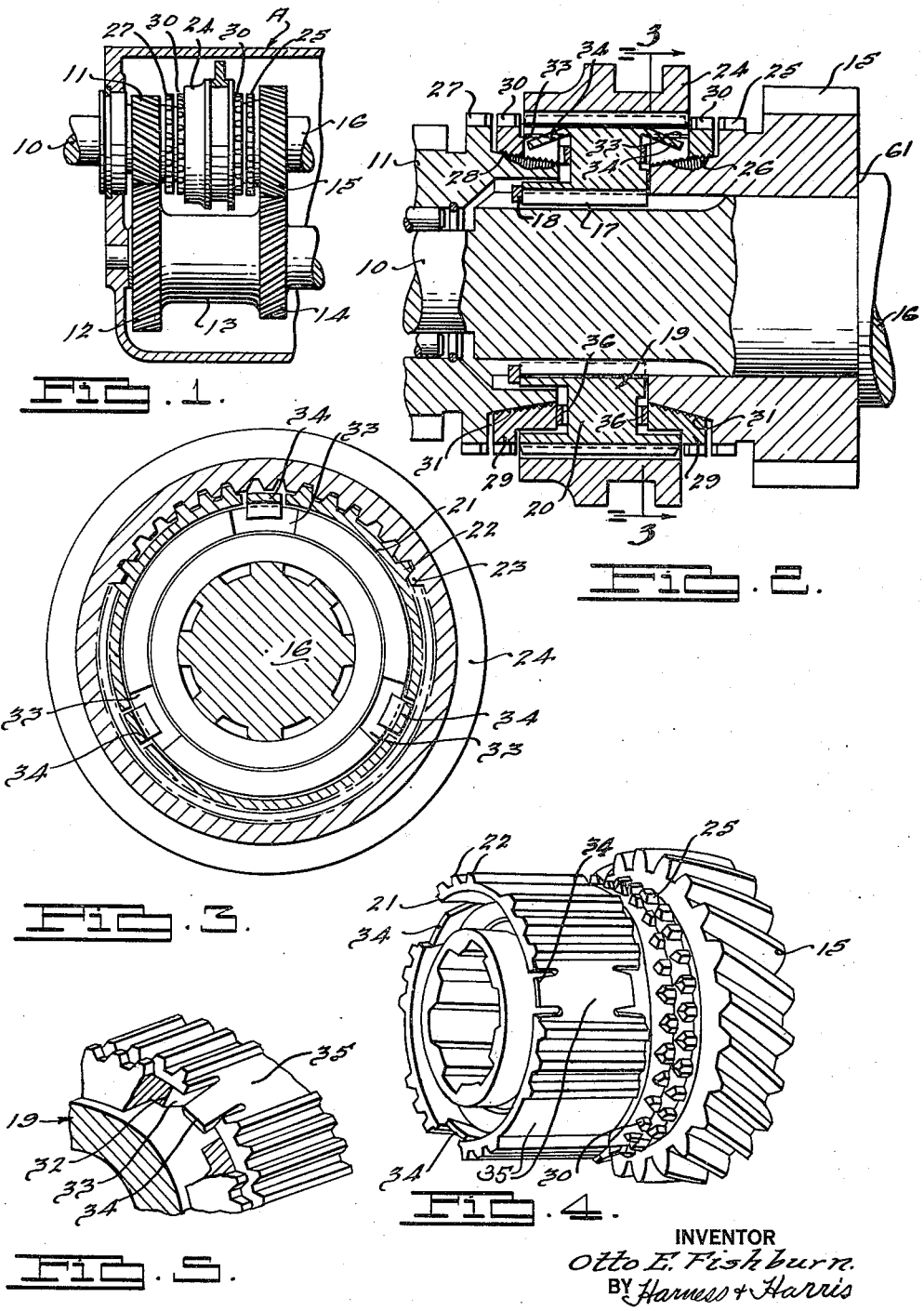
INVENTOR
Otto E. Fishburn.
BY Harness + Harris
ATTORNEYS.

Patented Jan. 15, 1946

2,393,153

UNITED STATES PATENT OFFICE 2,393,153

CLUTCH CONTROL MEANS

Otto E. Fishburn, Detroit, Mich., assignor to Chrysler Corporation, Highland Park, Mich., a corporation of Delaware Application May 13, 1944, Serial No. 535,422

4 Claims. (Cl. 192—53)

This invention relates to improvements in power transmitting mechanism including structures adapted to be positively clutched under control of blocker synchronizer means.

In mechanisms according to the foregoing type, the blocker synchronizer means is preferably frictionally engageable with one of the structures and has a driving connection with the other thereof accommodating disposition of the blocker means in positions respectively blocking and permitting clutching engagement.

An object of the invention is to provide an improved driving connection as aforesaid for the blocker synchronizer means characterized by its simplicity of design and economy of production.

Other objects and advantages of the invention will be more apparent from the following description taken in connection with the accompanying drawing, wherein:

Fig 1 is a fragmentary side elevational view, partly in section, of a transmission mechanism embodying the invention.

Fig. 2 is an enlarged fragmentary sectional view showing a portion of the Fig 1 mechanism.

Fig. 3 is a transverse section taken as indicated by line 3—3 of Fig. 2.

Fig. 4 is a view in perspective of a portion of the mechanism shown in Figs. 1 and 2.

Fig. 5 is a fragmentary perspective view illustrating a typical driving connection for a blocker synchronizer.

In the drawing I have illustrated my invention in connection with the second and direct speed drives of a conventional transmission A although my blocker synchronizer may be used wherever blocker clutching is desired. The transmission comprising the usual driving shaft 10 carrying the main drive pinion 11 meshing with countershaft gear 12. The countershaft 13 carries a gear 14 meshing with the second speed gear 15 which is loose on the transmission output shaft 16 and retained against axial displacement to the right, as viewed in Fig. 1, by shoulder 16' on shaft 16.

Splined at 17 to shaft 16 and preferably fixed by ring 18 and gear 15 against movement axially of this shaft is a hub 19 having a radially extending body part 20 and a peripheral rim 21 extended axially beyond the body part 20 and formed with a series of axially extending external splines 22 engaged by the internal teeth 23 of a shift clutch member or sleeve 24.

Gear 15 has a forwardly extending portion formed with a series of external clutching teeth 25 and a friction clutching cone surface 26 and gear 11 likewise has a rear extension formed with clutching teeth 27 and a cone surface 28. The sleeve teeth 23 are selectively engageable either with teeth 25 or 27 when the sleeve 24 is shifted rearwardly or forwardly to respectively drive the shaft 16 from the shaft 10 in the second or direct speed ratios.

As a means for frictionally synchronizing shaft 16 and hub 19 with gear 15 or gear 11 and preventing the positive clutching of the sleeve 24 with the teeth 25 or 27 prior to synchronization, I have provided blocker synchronizers in the form of rings 29 each provided with blocker teeth 30 of the same diametrical pitch as the teeth 23, 25 and 27, the teeth of the rings being disposed respectively between teeth 23 and teeth 25 and 27, as shown in Fig. 2, so that the blocker teeth will prevent shift of the sleeve until the parts to be positively clutched are synchronized.

Each blocker 29 is mounted on the cone surface of its associated gear 11, 15 and has a threaded friction surface 31 engaged with the associated friction surface 26, 28. An annular part 32 of each blocker extends axially from the teeth 30 beneath the peripheral rim 21 of the hub 19, as shown more particularly in Fig. 5 wherein is illustrated a typical drive connection between a blocker 29 and the hub 19. Each such annular part 32 is provided with a plurality of circumferentially spaced recesses or openings 33 respectively receiving a tongue or lug 34 carried by the rim 21 of the hub 19.

The rim 21 of hub 19 has a plurality of gaps 35 between adjacent splines 22 and the rim at such gaps is cut axially to provide a tongue or tab 34, the latter being deflected downwardly into an adjacent recess 33 to thus provide a driving connection between the blocker 29 and hub 19.

Each blocker 29 is urged axially away from the hub 19 by a spring 36 to engage the friction surface 31 thereof with the associated friction surface 26, 28 under such pressure as will insure positioning of the teeth 30 in their Fig. 4 position to block shift of the sleeve 24 to clutch with the sets of teeth 25, 27 selected for clutching engagement. As shown in Fig. 3, each recess 33 has a circumferential dimension greater than the corresponding dimension of the tongue or lug 34 to thereby permit rotation of the blocker 29 relative to the hub 19 between a first position as shown in Fig. 4 blocking clutching shift of sleeve 23 as aforesaid and a second position wherein the teeth are so aligned relative to the teeth of the sleeve 23 and teeth 25 or 27 as to accommodate clutching engagement of the teeth of the sleeve 23 with the teeth 25 or 27. With the teeth 30 in blocking position engagement therewith of the teeth of the sleeve 23 during shift of the latter urges the associated friction surfaces into relatively heavy engagement to effect approximate synchronization of the parts to be clutched to thereby facilitate clutching engagement thereof. The blocker threads are preferably left hand to aid in release of the relatively heavy frictional engagement as aforesaid after the clutching engagement has been effected.

Although but one specific embodiment of the invention has herein been shown and described, it will be understood that various changes in the size, shape and arrangement of parts may be made without departing from the spirit of my invention.

I claim:

1. In a power transmitting mechanism including relatively rotatable parts adapted to be clutched, one of said parts comprising a set of clutch teeth and a friction surface rotatable therewith, a hub rotatable with the other of said parts, a second set of clutch teeth driven with said hub and shiftable toward the first set of clutch teeth for clutching therewith, a blocker having blocker means disposed between said sets of clutch teeth engageable with said second set of clutch teeth to block said clutching prior to approximate synchronization of said parts and having a friction surface engageable with the first mentioned friction surface, said hub including a radially extending body portion and a rim axially overhanging said body portion, a part of said blocker extending beneath said rim and having a recess therein, a portion of said rim having adjacent circumferentially spaced axially extending slits forming therebetween a tongue deflected to extend into said recess to form a driving connection between said blocker and hub, said recess and said tongue being so relatively dimensioned as to accommodate rotation of said blocker relative to said hub between first and second positions respectively blocking and accommodating said clutching.

2. In a power transmitting mechanism including relatively rotatable parts adapted to be clutched, one of said parts comprising a set of clutch teeth and a friction surface rotatable therewith, a hub rotatable with the other of said parts, a second set of clutch teeth driven with said hub and shiftable toward the first set of clutch teeth for clutching therewith, a blocker including a radially extending part having blocker means disposed between said sets of clutch teeth engageable with said second set of clutch teeth to block said clutching prior to approximate synchronization of said parts and having a friction surface engageable with the first mentioned friction surface, said hub including a radially extending body portion and a rim axially overhanging said body portion and terminating adjacent said blocker part, said blocker including an annular part extending axially from said radial part to underlie said rim and having a recess therein, and a tongue integral with said rim and deflected downwardly from the main body thereof to extend into said recess to form a driving connection between the blocker and said hub and accommodating rotation of said blocker relative to said hub between first and second positions respectively blocking and accommodating said clutching.

3. In a power transmitting mechanism including relatively rotatable parts adapted to be clutched, one of said parts comprising a set of clutch teeth and a friction surface rotatable therewith, a hub rotatable with the other of said parts, a second set of clutch teeth driven with said hub and shiftable toward the first set of clutch teeth for clutching therewith, a blocker having blocker means disposed between said sets of clutch teeth engageable with said second set of clutch teeth to block said clutching prior to approximate synchronization of said parts and having a friction surface engageable with the first mentioned friction surface, said hub including a peripheral rim having axially extending splines engaged with said second set of clutch teeth and a gap between adjacent splines axially overlapping a portion of said blocker, the rim at said gap having axially extending circumferentially spaced slits and a tongue intermediate the same deflected in part from the plane of said rim and said blocker having an opening receiving said tongue to drivingly connect said portion with said hub, said opening and said tongue being so dimensioned as to accommodate rotation of said blocker relative to said hub between first and second positions respectively blocking and accommodating said clutching.

4. In a power transmitting mechanism including relative rotatable structures adapted to be positively clutched under control of a blocker having a friction connection with one of said structures and an opening therein, the other of said structures including a toothed peripheral rim having a gap between adjacent teeth and axially overlapping the blocker at said opening; a driving connection between said other structure and said blocker accommodating rotation of the latter between positions respectively blocking and accommodating said clutching including a tongue formed from said rim at said gap and so deflected as to extend in part into said blocker opening.

OTTO E. FISHBURN.

Certificate of Correction

Patent No. 2,393,153.　　　　　　　　　　　　　　　　January 15, 1946.

OTTO E. FISHBURN

It is hereby certified that errors appear in the printed specification of the above numbered patent requiring correction as follows: Page 2, second column, line 37, claim 3, after the word "blocker" insert *portion*; line 38, same claim, after "said" first occurrence, insert *blocker*; and that the said Letters Patent should be read with these corrections therein that the same may conform to the record of the case in the Patent Office.

Signed and sealed this 22nd day of July, A. D. 1947.

[SEAL]

LESLIE FRAZER,
*First Assistant Commissioner of Patents.*